Dec. 24, 1968          L. C. ANTHONY                3,417,889
                   MATERIAL HANDLING MACHINE
Filed Sept. 28, 1966                          3 Sheets-Sheet 1

INVENTOR
LUTHER CLARY
     ANTHONY
BY  Stowell & Stowell
           ATTORNEYS

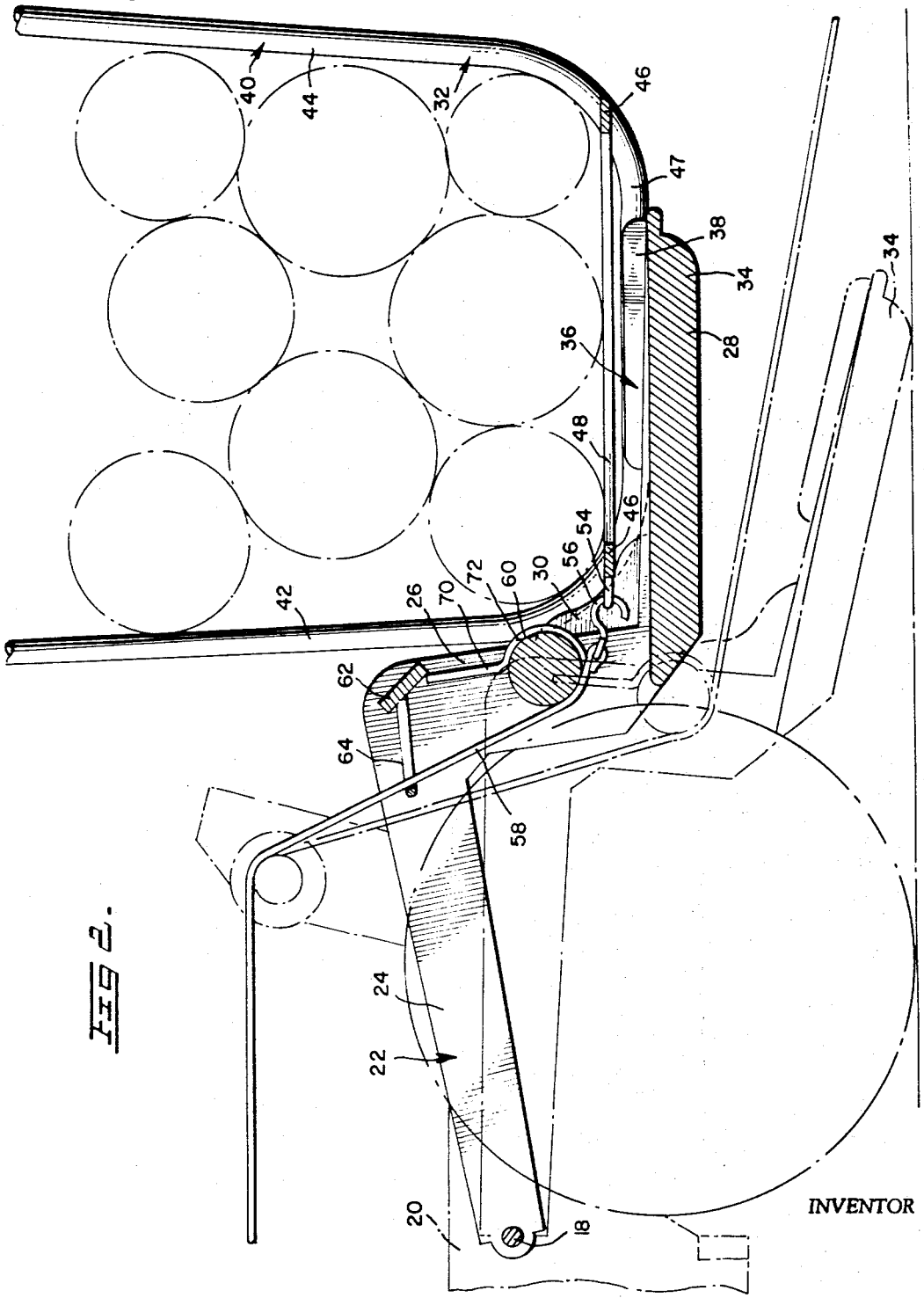

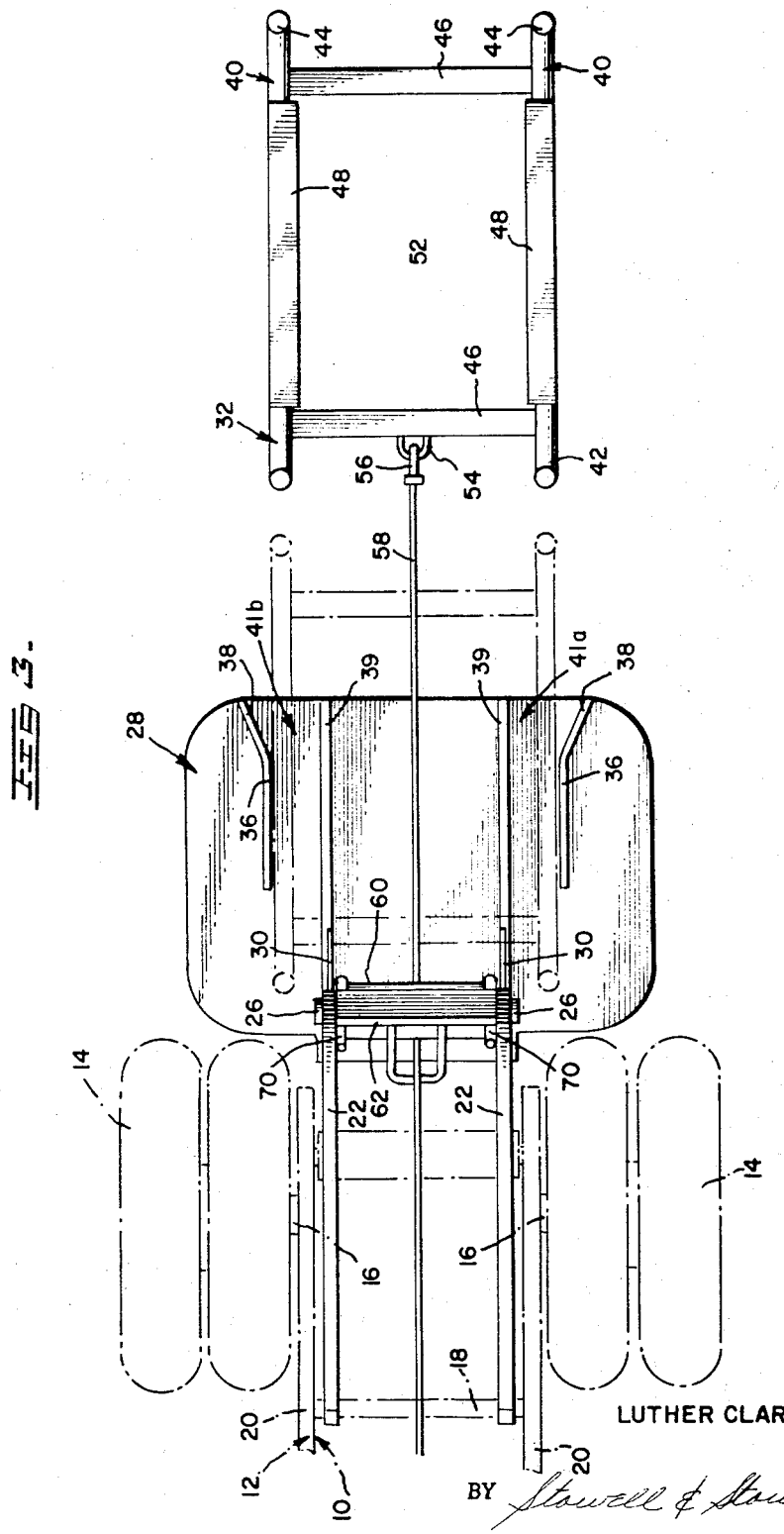

United States Patent Office 3,417,889
Patented Dec. 24, 1968

3,417,889
MATERIAL HANDLING MACHINE
Luther Clary Anthony, 107 4th St. NW.,
Springhill, La. 71075
Filed Sept. 28, 1966, Ser. No. 582,676
5 Claims. (Cl. 214—505)

ABSTRACT OF THE DISCLOSURE

A pallet handling machine is provided which has means for dragging a loaded pallet from a position remote from the machine on to a liftable platform forming a part of the machine, and thereafter for transporting the loaded and lifted pallet to another location. The means for dragging the loaded pallet is also utilized in holding the loaded pallet on the lifting arms of the machine.

The present invention relates to a material handling machine and more particularly to a pallet or the like carrier that can be utilized for dragging a load of material upon the ground and thereafter lifting the material from contact with the surface of the ground so it can be transported by a vehicle to another location.

It is an object of the present invention to provide a material handling machine that is provided with a lift or pan upon which the pallet is carried after it has been lifted from the ground.

It is another object of the present invention to provide such a device that has a pan connected to arms pivoted to a tractor frame for lifting a pallet from the ground to an elevated position.

It is another object of the present invention to provide a material handling machine associated with a pallet for carrying a load of material thereon, such as logs or the like, and which pallet can be dragged along the ground and thereafter positioned on a platform or pan provided with winch means for lifting the pan and pallet to an elevated position.

It is yet another object of the present invention to provide a carrier that is connected to arms pivotally mounted to the opposite sides of a vehicle frame which carrier has guide means thereon so that a pallet or the like may be properly centered and held snugly in place by pressure from the winch line means when it is lifted or elevated from contact with the ground.

It is another object of the present invention to provide a pallet carrier having a pan with arms connected to a frame of a vehicle which pan is set at an angle so that its leading edge is lower than its rearward edge when the pan is disposed in its lowermost positions so that the pan has a sliding quality which permits it to be urged along the ground.

It is another object of the present invention to provide a pallet carrier having a pan that can be lifted to a transport position by tensioning or tightening up on the winch line.

It is yet another object of the present invention to provide a vehicle having a platform means adapted to receive a pallet thereon and winch means for dragging the pallet upon the platform means after which the pallet and the platform means may both be lifted together by the winch means.

The invention generally comprises in combination a material handling machine and a separable load carrier, said machine including a main frame, a platform pivotally mounted on said main frame and adapted to receive said load carrier, a flexible draft member connected at one end to a winch carried by the machine, guide means for said flexible draft member associated with said platform and pivotal therewith, said load carrier including means for attaching the free end of said flexible draft means and stop means on said platform engageable by said load carrier to transfer the torque of the flexible draft member from the load carrier to said platform.

Various other objects and advantages of the present invention will be readily apparent from the following detailed description when considered in connection with the accompanying drawings forming a part thereof and in which:

FIGURE 2 is an enlarged detail view partly in section of the machine shown in FIGURE 1, and FIGURE 3 is a top plan view of the machine embodying the present invention.

Figure 1:
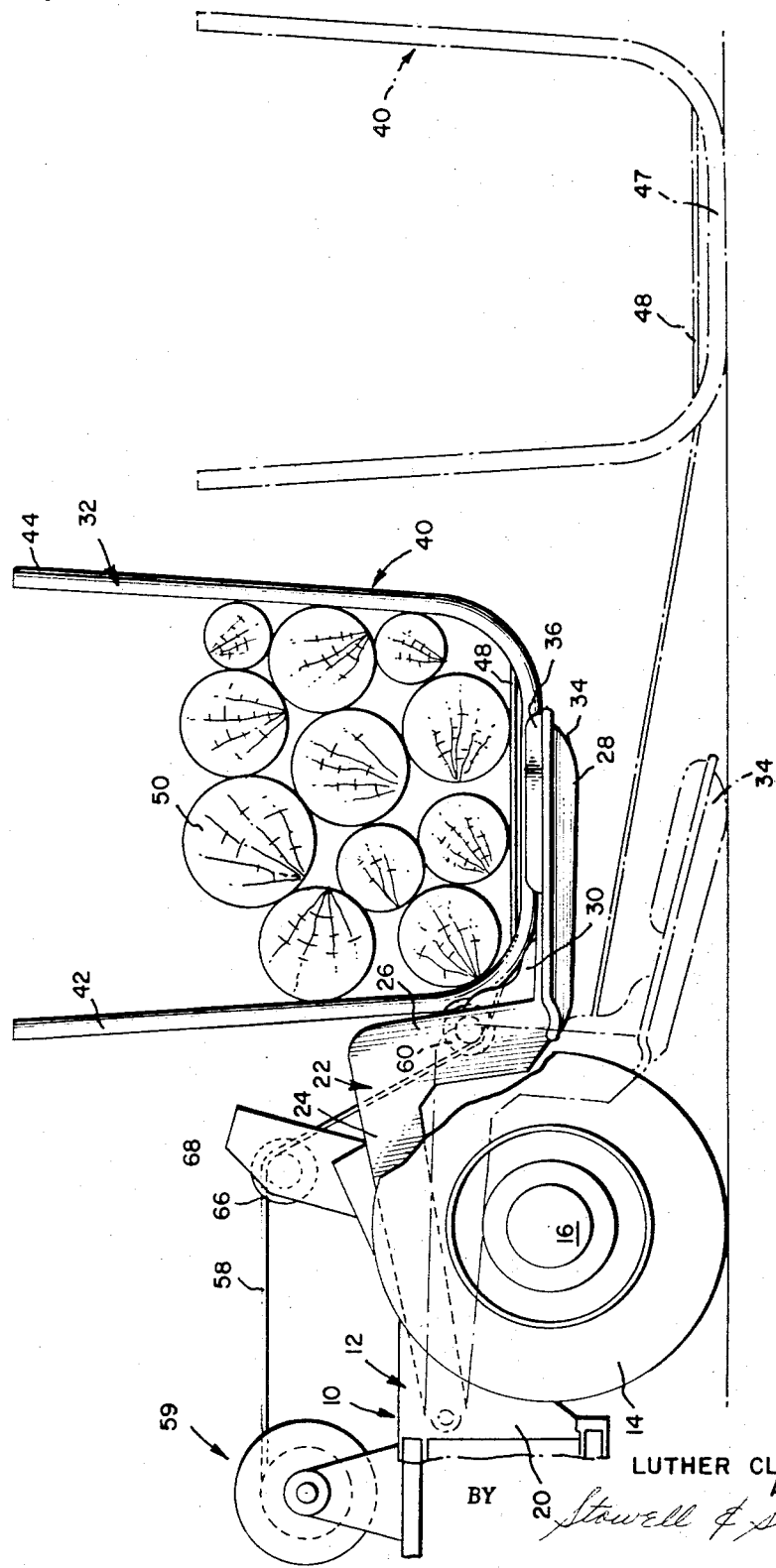
FIGURE 1 is a side elevational view of a material handling machine embodying the present invention.

Referring to the drawings the reference numeral 10 generally designates a vehicle or tractor having a main frame 12 with a set of rear wheels 14 on an axle 16.

A transversely extending pin 18 extends between the frame members 20 just forward of the rear wheels 14. The pin 18 has arm members 22 connected thereto and extending rearwardly thereof. The arm members 22 form part of the pallet carrier and include a substantially horizontally extending upper arm portion 24 and a vertical arm portion 26 terminating in a pan, platform or lift 28.

The pan 28 extends a substantial distance beyond the rear of the vertical arm portions 26 and is preferably generally rectangular in configuration. The arm members 22 are disposed inwardly of the sets of rear wheels 14, as best seen in FIGURE 3 and the vertical arm portions or legs 26 have triangular plates 30 welded to the lower end thereof and to the pan 28 so as to form stop members for the pallet 32 as hereinafter described. The pan 28 may have suitable strut members reinforcing it if desired.

Referring to FIGURES 1 and 2 it will be noted that the pan 28 is set at an angle when it is disposed in its lowermost position in contact with the ground surface so that its forward end 34 is disposed at a position lower than its rear edge so that the pan can have a sliding quality which will allow it to be dragged or urged along the ground by the vehicle 10. The pan 28 is also provided with laterally spaced longitudinal guide members or rails 36 adjacent its forward edge. The guide members, as best seen in FIGURE 3, have outwardly extending or flared portions 38 so as to properly guide the pallet 32 into an alignment on the pan 28 as it is dragged thereon. The pan 28 is also provided with a pair of rails 39, mounted inwardly of rails 36 so that the pair of rails 36 in cooperation with rails 39 define a pair of channels designated 41a and 41b.

The pallet 32 may comprise two U shaped members 40 disposed laterally of one another and having legs 42 and legs 44 with transverse braces 46 extending between the U shaped members 40. The bight 47 of members 40 are provided with longitudinal plates 48 for supporting a plurality of logs 50 thereon. The logs 50 are disposed within the U shaped members so as to extend transversely of the pallet. The braces 46 and the plates 48 form a central opening 52 therein and an eye or loop 54 is welded to the cross-brace 46 for connecting the hook 56 of a cable, winch line or flexible draft member 58 thereto. The other end of the flexible draft member is connected to a power operated winch means generally designated 59.

A horizontal roller member 60 extends between the lower portion of the vertical arm portions 26 and may be pinned to the arm portions 26 so as to be rotatable. The roller member 60 is disposed in spaced relationship with the lower end of the arm portions so that the cable 58 may pass under the roller. An inclined plate 62, as best seen in FIG. 2, extends between the upper ends of the vertical arm portions 26 and has connected thereto a U- shaped guide loop 64 through which the winch line 58 passes.

Another roller member 66 extends transversely of two rigid vertical support arms 68 secured to the main frame members 20 by any suitable means so as to guide the winch line 58 forward to the winch, not shown.

Referring to FIGURE 2, it will be noted that there are two guide rods 70 each having a straight upper section and a curved lower section 72 disposed adjacent opposite sides of the roller member 60 and secured such as by welding to the generally vertical portions of the arms 22 to prevent the winch line 58 from inadvertently slipping off the end of either side of the roller member 60.

In operation when it is desired to load a number of logs 50 upon the pallet 32, if the pallet 32 is disposed upon the pan 28 and the pan is in its lifted or uppermost position, as shown in FIGURE 2, the winch mechanism is released so that the line 58 will become slack and the pallet carrier will assume the position shown in FIGURE 2 in dot dash lines. At this time the hook 56 can be uncoupled or disconnected from the eye 54 and the vehicle can be backed away from the pallet so that the pallet will slide off of the pan 28. After the pallet is loaded with for example logs the cable line 58 may be loosened sufficiently so that the hook 56 can be inserted in the eye 54. Thereafter the winch is operated so that the winch line 58 is tensioned and pulls the pallet from the position shown in FIGURE 3 to the dot dash position shown in FIGURE 3 at which time the pallet is on the pan 28. It will be noted that the provision of the guide members 36 and 39 permits the pallet to be properly centered onto the pan 28. Thereafter as the winch line is wound in it will pull the pallet 32 forward on the pan 28 until the front legs 42 of the pallet bear against the stop members 30. At this time the end of the winch line 58 extends underneath the roller member 60 while the front legs 42 which bear against the stop members 30 cause the arms 22 and the entire pallet carrier to be pivoted about the pins 18 so that the pallet carrier is lifted from a position in contact with the ground to an elevated transport position as shown in FIGURES 1 and 2. Thereafter the vehicle may transport the load of logs to the desired location where they are to be discharged, and the winch line can be unwound to again lower the pallet carrier to the ground at the angle shown in dot dash lines in FIGURES 1 and 2. With the cable or winch line still in a released position, the vehicle is then moved away so that the pallet carrier and pan 28 slides out from under the pallet. It will be noted however that the pallet may then be lifted upon a truck for transportation to another place, if desired.

From the foregoing description it is apparent that the present invention provides a sturdy and compact and yet economical material handling machine for a pallet that can be utilized in the combination of a dragging and lifting operation.

Inasmuch as various changes may be made in the relative arrangement and location of the parts without departing from the spirit of the invention, the drawings are not meant to limit the scope of the invention except as defined by the appended claims.

I claim:

1. In combination a material handling machine and a separable load carrier, said machine including a main frame, a platform pivotally mounted on said main frame and adapted to receive said load carrier, a flexible draft member connected at one end to a winch carried by the machine, guide means for said flexible draft member associated with said platform and pivotal therewith, said load carrier including means for attaching the free end of said flexible draft means and stop means on said platform engageable by said load carrier to transfer the torque of the flexible draft member from the load carrier to said platform, wherein said machine includes a pair of laterally spaced arm members, pin means pivotally connecting one end of each of said arm members to said main frame and the other end of each of said arm members to said platform for swingable movement of said platform in a vertical plane, roller means extending transversely of said arm members and spaced above said platform, said draft means being adapted to extend between said roller means and platform for causing said load carrier to abut said roller means when said draft means is tensioned.

2. The invention of claim 1 wherein said arm members comprise horizontal portions pinned to opposite sides of said frame and vertical portions extending downwardly from the rear ends of said horizontal portions, and said platform extends rearwardly of said vertical portions, and is disposed adjacent the lower end of said vertical portions.

3. The invention defined in claim 2 wherein said platform is provided with laterally spaced and longitudinally extending guide means for guiding said load carrier when it is pulled toward an abutting position with said stop means.

4. The invention of claim 3 wherein said platform is secured to said vertical arm portions with its loading edge lower than its other edge when in a downward position.

5. The invention of claim 4 wherein said arm members are provided with rod guide means disposed adjacent opposite sides of said roller means to prevent entanglement of said draft means with said roller means.

References Cited

UNITED STATES PATENTS

| | | | |
|---|---|---|---|
| 1,290,267 | 1/1919 | McFarland | 214—505 |
| 1,870,573 | 8/1932 | Kuchar | 214—517 X |
| 2,161,734 | 6/1939 | Wheless. | |
| 2,529,752 | 11/1950 | Whittle | 214—517 |

ALBERT J. MAKAY, *Primary Examiner.*

U.S. Cl. X.R.

214—517, 85.5